Patented Aug. 29, 1933

1,924,607

UNITED STATES PATENT OFFICE 1,924,607

FLOTATION METHOD

Mahlin S. Hansen, Indianapolis, Ind., assignor to Peter C. Reilly, Indianapolis, Ind.

No Drawing. Application May 2, 1931
Serial No. 534,700

7 Claims. (Cl. 209—166)

This invention relates to an improved process of concentration and recovery of metals and metalliferous constituents from their ores; and more especially relates to the recovery of minerals occurring as oxids, oxidized sulfids, carbonates, sulfates, silicates, vanadates, etc., which are not readily amenable in their natural state to concentration by the usual flotation methods.

The object of the invention is to provide a treatment for such refractory substances which shall make them more amenable to flotation.

It has been heretofore proposed to effect the concentration of oxidized ores, of which the above-named classes are examples, by converting the oxidized mineral constituents wholly or superficially to sulfids by the use of hydrogen sulfid or of other soluble sulfids, and then subjecting the ore to any of the usual processes, such as the froth-flotation process, for effecting the separation of sulfids from gangue. While in many instances the sulfid treatment is of great advantage, it entirely fails in other cases, one example of such failure being on some oxidized ores of copper.

The present invention is based upon the discovery that various ores and chemical combinations which do not respond to the sulfidizing treatment may be made amenable to flotation methods by a treatment with a soluble inorganic selenide or telluride, such as the selenides or tellurides of the alkali metals or of hydrogen. By such treatment it is found that in the subsequent flotation operation a much sharper and cleaner separation is obtained of the oxidized sulfids, carbonates, oxids, silicates, or other valuable constituents of the ore from the accompanying gangue, and that the greater mineral recovery contributes to make the flotation process remunerative in cases where it would otherwise commercially fail.

Soluble inorganic selenides or tellurides may readily be prepared by various well-known methods, and may be used in crude form as well as in relatively pure form. I have prepared them by direct combination of the elements. For example, sodium and selenium, in proper molecular proportions, are heated together. A vigorous reaction occurs, resulting in the formation of sodium selenide ($Na_2Se$). I have prepared sodium telluride in a similar manner, using tellurium in place of selenium, with the resulting formation of sodium telluride ($Na_2Te$). I have also prepared them by heating selenium, for instance, with sodium hydroxide or with sodium carbonate; which gives a crude sodium selenide that is effective in my proces.

I have found that the use of soluble inorganic selenide or telluride, such as sodium selenide or sodium telluride, or hydrogen selenide or hydrogen telluride, yields a highly mineralized froth in the flotation operation and produces a high mineral recovery. The soluble inorganic selenides or tellurides not only superficially alter the oxidized mineral particles so as to make them amenable to flotation, but also precipitate as selenides or tellurides many metals which may occur in the form of soluble salts, for example copper occurring as the sulfate. These precipitated selenides or tellurides are included in the concentrate obtained in the flotation process.

The amounts used of the selenides or tellurides may vary widely, depending on the mineral content and the state of oxidation of the ore being floated. Desirably, in commercial practice, just enough is used to produce flotation of the oxidized mineral present; although in the examples which I give below I make no effort to limit the amounts used to the minimum effective amounts. In the ores I have treated, the amount of selenide or telluride used has usually been between 0.2 and 4.0 lbs. per ton of ore; but this is not stated as a limitation on the amount that may be used.

I have found that the soluble inorganic selenide or telluride is beneficial in the flotation operation on oxidized ores whether it is added during the wet grinding stage of the ore, preparatory to flotation, or during the flotation stage; and also, if the latter, whether it is added to the ore pulp simultaneously with the frothing and collecting agents or after their addition. The soluble selenides or tellurides may be used in alkaline, neutral, or acid flotation circuits. Any suitable frothing agent, such as pine oil or cresylic acid, and any suitable collecting agent, such as potassium ethyl xanthate or sodium dicresyl dithiophosphate or butyl thiophospho-oleic acid (the last being a recent invention of Orin D. Cunningham), may also be used; the choice of frothing agent and of collecting agent depending on the ore.

As in most chemical processes, the chemical reactions of the present process are accelerated by heat. With some very refractory ores I have found it desirable to heat the ore pulp with the selenide or telluride to a temperature of about 90° to 150° F., and under such conditions I have obtained very satisfactory results.

The practice of the invention may be illustrated by the following three comparative examples: 1, on a whole ore, modified by sodium selenide; 2, on slimes from that same ore, modified by sodium selenide; and 3, on the sands of that same ore, modified by sodium telluride. For these three comparative examples I use a highly oxidized ore of copper from the Chuquicamata mine, containing such minerals as brochantite, atacamite, malachite, cuprite, chalcocite, and chalcopyrite. I take this ore for these examples because it is a highly oxidized ore; and do not use it in any way as a limitation on the ores to which my invention is applicable.

Example No. 1

A charge of this Chuquicamata ore was ground in a ball mill with a quantity of sodium selenide equivalent to one pound per ton of ore, together with sufficient water to make a 1—to—1 pulp. The grinding was continued to the point where the mineral content of the ore was released from the gangue constituents. This occurred substantially at a fineness of about 10% plus 100 mesh. The pulp was then taken from the ball mill, diluted with water to 30% solids, and treated in a flotation cell in accordance with ordinary flotation practice. A high-grade concentrate, containing 95% of the copper content of the ore, was obtained.

Using the same ore, and following the same procedure as outlined in Example 1 but without addition of sodium selenide, a low-grade concentrate, containing only 55% of the copper content of the ore, was obtained.

Example No. 2

A charge of slimes from the same ore as used in Example No. 1, and comprising the minus 300 mesh material, was diluted with water to 30% solids, an amount of sodium selenide equivalent to two pounds per ton of solids was added to the flotation cell simultaneously with the collecting and frothing agents, and the usual flotation operation was carried out. This resulted in a high-grade concentrate, containing 86.0% of the total copper.

Using the same ore, and following the same procedure as outlined in Example No. 2 above but without the addition of sodium selenide, a low-grade concentrate, containing only 50% of the total copper in the charge, was obtained.

With the same ore, procedure, and conditions given in Example No. 2, sodium sulfid was used instead of sodium selenide as the modifying agent; and was found to be decidedly inferior to it.

Example No. 3

A deslimed charge of the same ore as that employed in Example 1 was ground in a ball mill with a quantity of $Na_2Te$ equivalent to 4 pounds per ton of charge, together with sufficient water to make a 1—to—1 pulp. The grinding was continued to a fineness of about 10% plus 100 mesh. The pulp was then added to the flotation machine, diluted with water to 30% solids, and subjected to the ordinary froth-flotation procedure. A distinctly green high-grade concentrate, containing 90% of the copper content of the deslimed ore treated, was obtained.

Thus, the telluride as well as the selenide constitutes a new and very effective conditioning agent for oxidized ores, and makes possible the more efficient recovery of oxidized and oxid mineral by the froth-flotation process.

I repeated Example 3, using sodium selenide as the conditioning agent; and found that in the proportion of 0.25 lbs. per ton of charge it gave a high-grade concentrate, containing about 95% of the copper content of the charge.

Procedures similar to those of Examples 1, 2, and 3 above were carried out on other ores, especially those which are more or less oxidized. For instance, using the procedure of Example No. 1 on copper ore from the Copper Queen mine, which ore is oxidized only to about one-fourth the extent of that from the Chuquicamata mine, I obtained a high-grade concentrate, containing about 86% of the copper content of the ore; as against a lower grade concentrate, containing about 78% of the copper content of the ore, when the same ore was treated by the same procedure but without the sodium selenide.

These procedures of Examples 1, 2, and 3, although of greatest effect on the oxidized portions of the ores, are not limited in their effect to those portions; but in addition have no adverse effect, and in most instances have a beneficial effect, on the flotation of the sulfid portions of the ores. In consequence, my flotation process acts on both the oxidized and the sulfid portions of the ores; although more effectively on the oxidized portions.

Because these procedures are effective on the sulfid portions of the ores, the procedures of Examples 1, 2, and 3 may therefore also be used on ores in which there are relatively small amounts of oxidized constituents. For instance, those procedures may be used effectively on ores from the Anaconda mine, in which the ores are mainly sulfids, and the oxidized portions of the ore are ordinarily not more than 5 or 6% of the whole. But although my procedures are thus applicable with advantage to such ores, the advantage is more marked on the oxidized ores which are more difficult to float.

Further, I have found that my ore-conditioning reagents are quite highly selective in their actions on minerals of different metals, increasing the floatability of the minerals of some metals, for example of silver and copper minerals, much more markedly than they do that of minerals of other metals, that is for instance iron minerals. In consequence, if an ore contains minerals of silver, copper, and iron, the use of my ore-conditioning reagents makes for a concentrate of higher grade in terms of silver and copper, and of a character most desirable for smelting.

The term "oxidized minerals" is used herein in contradistinction to "sulfid minerals", and includes the oxids, carbonates, sulfates, phosphates, molybdates, vanadates, chlorides, and bromides of the valuable metals contained in ores, and/or oxidized sulfids; by which latter term I mean sulfid ores that have been more or less oxidized. Examples of the oxidized minerals of lead, to which my process is applicable, include minium anglesite, pyromorphite, mimetite, cerrusite, crocoite, vanadinite, descloizite, and sulfenite; the oxidized minerals of silver include cerargyrite, bromyrite, and embolite; and the oxidized minerals of copper include cuprite, malachite, azurite, and tenorite.

Further, my invention is not limited to the sodium salts, for any other soluble inorganic selenides and tellurides may be employed. For example, I may use potassium selenide or potassium telluride; or hydrogen selenide or hydrogen telluride; or the polyselenides and polytellurides of sodium or potassium.

I claim as my invention:

1. The process of concentrating materials by froth flotation, which consists in subjecting the unconcentrated material to froth flotation in the presence of a material of the class consisting of soluble inorganic selenides and tellurides.

2. The process of concentrating materials by froth flotation, which consists in subjecting the unconcentrated material to froth flotation in the presence of a soluble inorganic selenide.

3. The process of concentrating materials by froth flotation, which consists in subjecting the unconcentrated material to froth flotation in the presence of a soluble inorganic telluride.

4. The process of concentrating materials by froth flotation, which consists in subjecting the unconcentrated material to froth flotation in the presence of sodium selenide.

5. The process of concentrating materials by froth flotation, which consists in subjecting the unconcentrated material to froth flotation in the presence of sodium telluride.

6. The process of concentrating materials by froth flotation, which consists in subjecting the unconcentrated material to froth flotation in the presence of hydrogen selenide.

7. The process of concentrating materials by froth flotation, which consists in subjecting the unconcentrated material to froth flotation in the presence of frothing and collecting material and of a material of the class consisting of soluble inorganic selenides and tellurides.

MAHLIN S. HANSEN.